Feb. 27, 1968     S. V. BOWLES     3,370,525

INTERCHANGABLE REFUSE TRUCK BODY WITH SELF-LOADING MECHANISM

Filed Sept. 24, 1965     2 Sheets-Sheet 1

INVENTOR.
SAMUEL V. BOWLES
BY Fulwider, Patton, Rieber
Lee, and Utecht
ATTORNEYS Feb. 27, 1968  S. V. BOWLES  3,370,525
INTERCHANGABLE REFUSE TRUCK BODY WITH SELF-LOADING MECHANISM
Filed Sept. 24, 1965  2 Sheets-Sheet 2
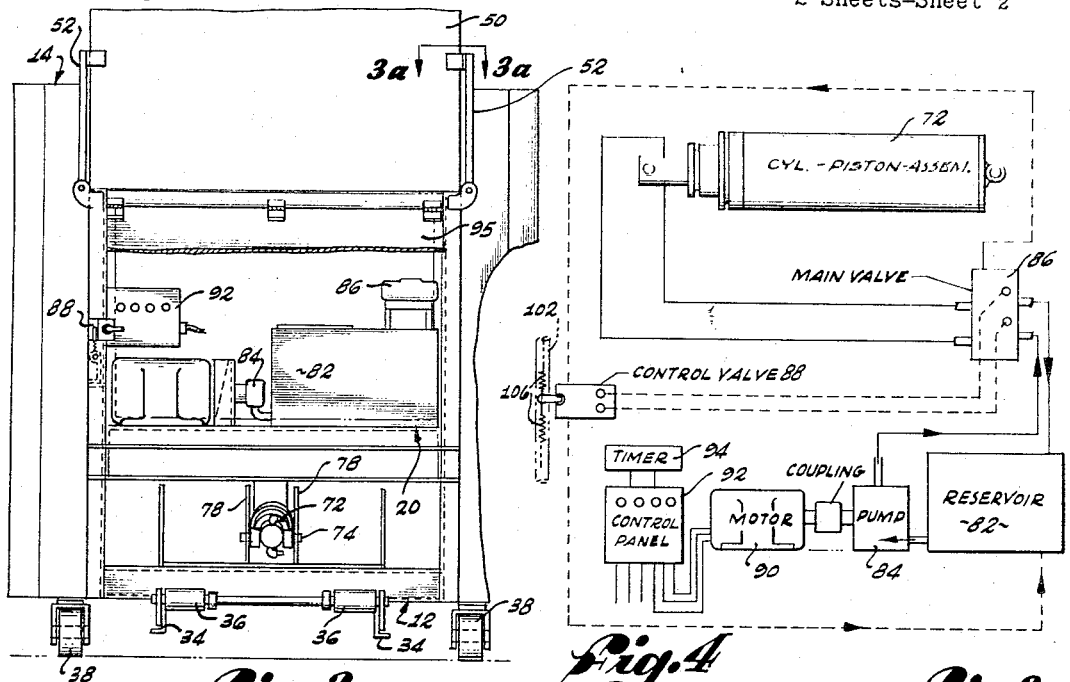
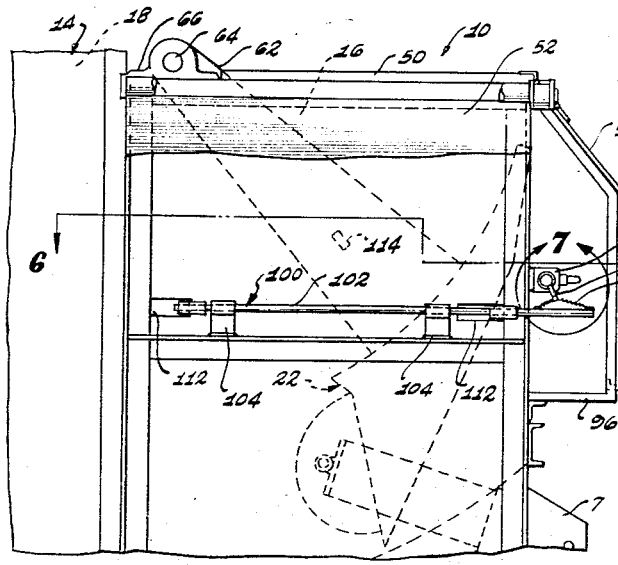
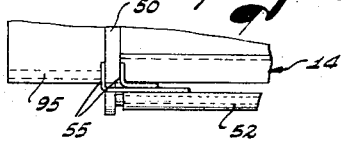
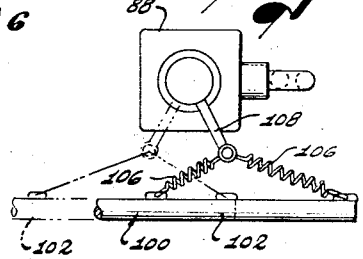
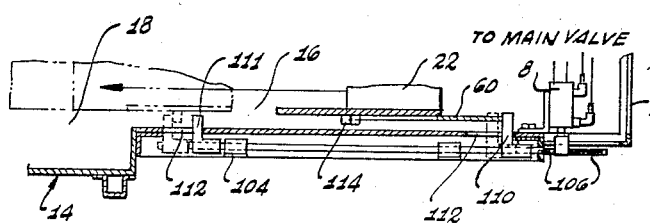
INVENTOR.
SAMUEL V. BOWLES
BY Fulwider, Patton, Rieber
Lee, and Utecht
ATTORNEYS United States Patent Office 3,370,525
Patented Feb. 27, 1968

3,370,525
INTERCHANGEABLE REFUSE TRUCK BODY
WITH SELF-LOADING MECHANISM
Samuel V. Bowles, 12039 Branford St.,
Sun Valley, Calif. 91352
Filed Sept. 24, 1965, Ser. No. 489,882
5 Claims. (Cl. 100—48)

ABSTRACT OF THE DISCLOSURE

An interchangeable refuse truck body with an automatic self-loading and refuse-packing mechanism. The truck body has a closed storage compartment and a loading compartment open on top. A bulkhead separates the two compartments and defines a passage between them. The packing blade assembly mounted for swinging movement in the loading compartment reciprocates a packing blade in the bottom of such compartment to push the refuse through the passage into a compacted condition in the storage compartment. Movement of the packing blade assembly is controlled by a timing mechanism and hydraulic valve assembly, whereby the packing blade assembly is actuated for predetermined time periods at preselected time intervals.

---

This invention relates to refuse handling equipment and, more particularly, to an improved refuse truck body of the removable or interchangeable type embodying a self-loading mechanism.

Interchangeable refuse truck bodies are now widely used, particularly in and around large urban areas in connection with collection and disposal of refuse from collection sites, such as markets, department stores, factories, apartments and the like, having large amounts of refuse to be disposed. Such a body is taken to a collection site with a suitable truck where it is unloaded and left at a convenient location for filling. Loading and unloading the body from the truck usually are facilitated by providing the truck with a tiltable frame. In carrying out loading and unloading operations, the frame is simply tilted upwardly to enable the body to slide or roll on or off under the influence or control of power-operated means.

Loading of the body with refuse at the collection site normally is accomplished by janitorial personnel simply dumping the refuse in through an open top. Once the body is filled, it is replaced with an empty one, and the former is then, of course, taken to a dump where it is emptied.

This scheme for collection and transporting refuse has obvious economic advantages. A single truck can service many collection sites where the bodies are stationed. Hence, efficient use is made of equipment, especially of the truck. Moreover, the time consuming job of transferring the refuse from small containers at the collection sites to a collection vehicle is eliminated. Accordingly, efficient use is also made of manpower.

While these important advantages exist, relatively inefficient use has been made of the available space in such interchangeable refuse truck bodies. This follows from the fact that common refuse is extremely bulky, although usually light in weight. In other words, bulk and not weight is virtually always the limiting factor in loading such a body.

A further problem inherent in refuse truck bodies of this type heretofore available is that refuse frequently spills or blows out of the open top, both at the collection site and especially during hauling to the dump, creating an unsightly, unsanitary condition.

Accordingly, it is a primary object of this invention to provide an improved interchangeable refuse truck body that obviates the problems inherent in bodies of this type heretofore available.

A further object is to provide an improved interchangeable refuse truck body embodying a self-loading mechanism, which enables highly efficient use to be made of the available storage space.

Another object of the invention is the provision of an improved refuse truck body of the type described embodying a self-loading mechanism operable in such a manner that refuse may be dumped into the body during periods of operation of the self-loading mechanism, as well as when it is inactive.

A still further object is to provide an improved body of the type described further characterized by the danger of refuse spilling or blowing out both while it is stationed at a collection site and during hauling of the loaded body is virtually eliminated.

These and other objects, features and advantages of the invention will be better understood by referring to the following detailed description taken in conjunction with the accompanying drawings in which:

FIGURE 3 is a fragmentary front elevational view illustrating certain elements of the means for powering the self-loading mechanism;

FIGURE 3a is a fragmentary sectional view taken along the line 3a—3a in FIGURE 3;

FIGURE 4 is a semi-schematic view of the illustrative power-operated means of the self-loading mechanism;

FIGURE 5 is a side elevational view, similar to FIGURE 2, which illustrates, in particular, the means for reversing the packing operation of the self-loading mechanism;

FIGURE 6 is a fragmentary sectional view taken along the lines 6—6 of FIGURE 5; and FIGURE 7 is a side elevational view on an enlarged scale of the area encircled by the line 7 in FIGURE 5.

Figure 1:
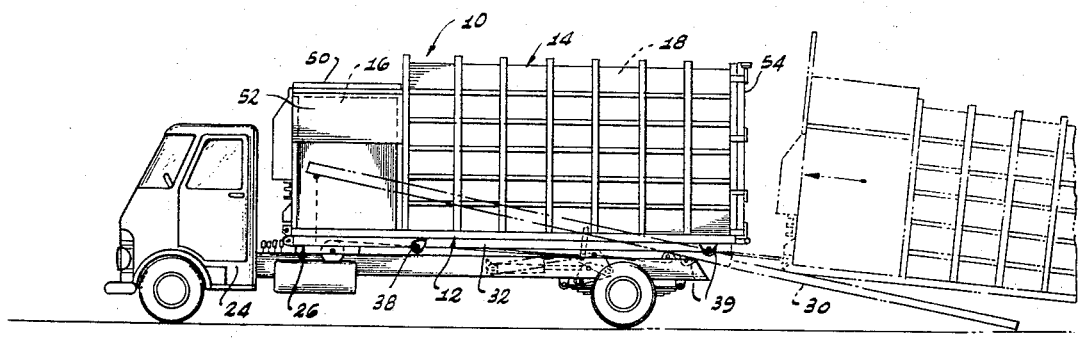
FIGURE 1 is a side elevational view of an interchangeable refuse truck body constructed in accordance with the invention and in place on a suitable truck, as would be the case during hauling to and from a collection site, the body being shown in phantom lines at an intermediate stage during loading onto the tiltable truck frame.

Referring to the drawings and in particular to FIGURE 1, numeral 10 designates the improved body of the invention. It comprises generally a frame 12 and an elongated receptacle 14 divided into a forward loading compartment 16 and a rearward storage compartment 18. A self-loading mechanism 20, including a packing blade assembly 22 disposed within the loading compartment 16, serves to transfer refuse from the loading compartment 16 to the storage compartment 18. This transfer is accompanied by compaction of the refuse from its usual bulky, loosely packed state into a relatively compacted state within the storage compartment 18. Moreover, the loading mechanism is arranged so that such transfer takes place without the necessity of interrupting the loading of the compartment 16 from the exterior.

The body 10 is shown in full lines in FIGURE 1 as in place on a suitable truck 24 with a tiltable frame 26. As suggested above, such a frame facilitates loading of the body 10 onto and off of the truck. As a further aid, the truck frame 26 is provided with a pair of extensible-retractable tracks 30, illustrated in phantom lines in FIGURE 1. These tracks 30 are adapted to extend from associated longitudinally oriented tracks 32 on the truck frame 26 and to engage the ground surface, so as to enable the body to roll or slide on and off the truck frame in the manner illustrated. Moreover, the tiltable frame 26 enhances dumping of the contents of the storage compartment out through the rear end thereof. The construction of the truck 24 forms no part of the present invention, and, therefore, is not described in further detail.

Considering the construction of the body 10 in more detail, the frame 12 includes a pair of longitudinally extending and laterally spaced channels 34 secured to the underside of the receptacle 14. These channels 34 are arranged so that when the body is on the truck they are disposed just outside their adjacent tracks 32. Preferably, as may be seen in FIGURE 3, rollers 36 are provided on the underside of the frame 12 to engage the tracks 30 and 32, and thereby reduce the force required to move the body therealong.

With a body of the present type, mobility is a desirable attribute. It is often necessary or desirable once the body is removed from the truck to maneuver it about. This is rendered possible in the illustrative case by forward and rearward wheels 38 and 39. Each of the wheels is secured to the frame 12 and projects downwardly therefrom for engagement with the ground. Preferably, the forward wheels 38 are of the swivel type.

The receptacle 14 comprises a generally closed container which is here of rectangular cross section. Disposed adjacent its forward end is a transverse bulkhead 40, illustrated in FIGURE 3. The bulkhead 40 extends entirely across the body and downwardly from its top wall, and serves to separate it into the compartments 16 and 18. The lower edge of the bulkhead 40 is spaced above the floor of the receptacle and cooperates therewith to define a passage 42 between the compartments. A plurality of laterally spaced, tapered teeth 44, one of which is illustrated in FIGURE 3, secured to a box beam 46 at the lower end of the bulkhead, tend to restrain return movement of refuse from the storage compartment 18 into the loading compartment 16.

As may be seen in FIGURES 1 and 3, the portion of the receptacle 14 forming the loading compartment 16 is somewhat smaller in cross section than the portion forming the storage compartment 18. It is, of course, desirable to have the storage compartment 18 of relatively large cross section in order to maximize its storage capacity. This same consideration does not hold true with respect to the loading compartment. However, it is desirable to make the latter sufficiently large in capacity that the loading mechanism 20 need not be operated each time a load of refuse is dumped from a hand-carried container into the compartment 16. Because of this, and in order that the mechanism may handle relatively large pieces of refuse, it is preferred, as in the illustrative case, that the width and height of the portion of the receptacle 14 forming the loading compartment 16 comprise major portions of the corresponding dimensions of the storage compartment 18.

The loading compartment has a top opening 48 through which refuse is dumped in from the exterior. Since loading occurs when a body is on the ground, as distinguished from on the truck, it is convenient to dump refuse in through this opening.

During periods of non-loading at the collection site and during hauling of the body to the dump site, it may be desirable to cover the opening 48. For this purpose, a cover 50 is hingedly mounted on the forward end wall of the receptacle 14 at the upper end thereof. During such periods it is swung down into covering relationship with the opening in the manner illustrated in FIGURES 1 and 5. The cover 50 may be used to advantage in cooperation with a pair of hingedly mounted side plates 52 in the manner illustrated in FIGURES 2 and 3 to increase the load-receiving capacity of the loading compartment 16. To this end, cooperating pairs of flanges 54 (FIGURE 3a) are provided on the ends of the side plates and arranged to engage the cover 50 in clamping relationship, so as to maintain the parts in a vertical orientation.

This cover-plate assembly 50, 52, when in use increases the loading height of the body. However, as brought out above, generally this does not present a problem because of the fact that the body rests on the ground during loading. As is apparent, the side plates 52 may be varied in height to correspondingly increase or decrease the loading height of the body. When not in use, these side plates 52 hang down against the sides of the receptacle.

Unloading of the storage compartment 18 is accomplished through a rearward opening, normally closed by conventional doors 55. Preferably, in order to facilitate unloading, the storage compartment 18 tapers slightly in width from a minimum adjacent the loading compartment 16 to a maximum adjacent the rear doors 54. This tends to obviate the problem of jamming of the compacted refuse as it moves rearwardly through the compartment. Besides this advantage during unloading, it will also be appreciated that this tapered configuration also operates to prevent jamming as the compartment is being loaded by the mechanism 20.

The self-loading mechanism 20, as noted above, functions to transfer refuse from the loading compartment 16 to the storage compartment 18 and to compact it therein. Transfer is through the passage 42 at the lower edge of the bulkhead 40. Movement of the refuse is accomplished by means of the packing blade assembly 22 reciprocable in an arcuate path in the compartment 20 between the limit positions illustrated in full and phantom lines in FIGURE 2. As shown in that figure, the assembly 22 includes a generally vertically arranged blade 56 and an arcuate-shaped cover 58 secured to the blade at its upper edge and extending rearwardly and upwardly therefrom. The blade 56 is oriented transversely in the compartment 16 and extends entirely thereacross except for working clearance. The assembly 22 is strengthened by a pair of side-plates 60 secured to the blade 56 and cover 58.

The packing blade assembly 22 is supported for swinging movement about a horizontal axis located adjacent the upper edge of the loading compartment 16 and adjacent the forward wall of the storage compartment 18. Mounting of the assembly 22 is achieved by means of a pair of elongated support arms 62 secured to the sideplates 60 and extending upwardly therefrom. These arms move in close proximity to the side walls of the loading compartment and, hence, in no way interfere with the loading operation. Extending transversely between the arms 62 at the upper ends, is a pivotal axle 64. The axle 64, in turn, is journaled for rotation at its opposite ends in a pair of support brackets 66 located, one each, at opposite sides of the receptacle 14.

This pivotal mounting of the blade assembly 20 is highly advantageous. It seems to virtually eliminate cocking or jamming of the assembly. In addition, it minimizes friction, and, therefore, less power is required to satisfactorily operate it than would otherwise be the case. Besides these important advantages, such a mounting arrangement is relatively simple and, hence, inexpensive.

Figure 2:
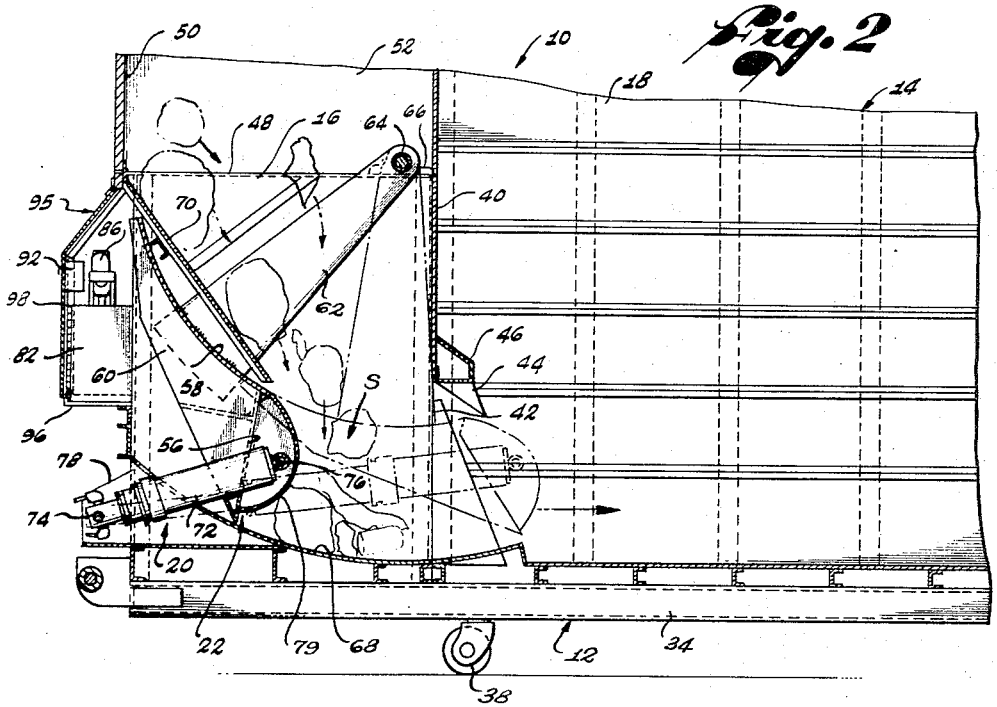
FIGURE 2 is a fragmentary side view, partly in elevation and partly in vertical section, showing the forward portion, particularly the self-loading mechanism, of the body of the invention.

In order to prevent refuse from passing between the lower edge of the blade 56 and the floor of the loading compartment 16 the latter is provided with an arcuate-shaped portion 68. The shape of this floor portion 68 conforms to the movement path of the lower edge of the blade 56 as may be seen in FIGURE 2. Similarly, a transversely arranged baffle plate 70 is provided in the loading compartment to prevent refuse from inadvertently passing to the forward or non-working side of the blade 46. Referring to FIGURE 2, it may be seen that the lower edge of the baffle plate 70 is disposed so as to be in close proximity to the cover 58 throughout the movement path of the blade assembly 22. The plate 58 is angularly oriented, sloping from the forward toward the rearward wall of the loading compartment 16 from top to bottom, so as to block off a minimum of the useful space.

The packing blade assembly 22 is power operated and means for so operating it include a double-acting hydraulic cylinder-piston assembly 72. Attention is directed to FIGURES 2 and 3 where it may be seen that the assembly 72 is centrally located and pivotally connected at its opposite ends to the frame 12 and to the assembly 22. Pivotal connection to the frame at 74 is through a pair of vertically arranged support plates 78, which, in turn, are anchored to the frame 12. Preferably, the connection at 76 to the blade assembly 22 is through a rearwardly projecting nose 79 on the blade shown in FIGURE 2. The end of the assembly 72 projects through an aperture in the blade and into the nose which has a width sufficient to freely accommodate the end of the cylinder-piston assembly 72. Connecting the assembly 72 to the packing blade assembly 22 in this manner is desired to enable the blade assembly 22 to make a full stroke between the full and phantom line positions in FIGURE 2.

Hydraulic power is furnished to the assembly 22 by an electric-hydraulic system shown semi-schematically in FIGURE 4. The system includes, in series, a reservoir 82, a pump 84 and a main valve 86, the latter element, in turn, being coupled to the assembly 72. Pressurized fluid alternately is directed to and exhausted from opposite ends of the double acting assembly 72 by the valve 86. Operation of the valve is controlled by a two-position, pilot-type control valve coupled to the valve 86. Depending upon the position of the control valve 88, the assembly 72 is either caused to extend to move the blade assembly toward the passage 42 or to retract to cause the blade assembly to move away from such passage.

In the illustrative case, the pump 84 is driven by an electric motor 90. Experience has shown that an electrical outlet is normally found in close proximity to the desired trash collection site. Thus, this means of furnishing power is convenient as well as economical. The connection of the motor 90 to an external power source (not shown) is through a conveniently located control panel 92 on the body. In applications where electrical power is unavailable, any other suitable for driving the pump 84, such as an internal combustion engine, can be provided.

While reciprocation of the packing blade assembly 22 is automatic during the periods of operation of the motor 90, as will be explained more fully below, it is necessary to stop and start the motor and this is done through the control panel 92.

In some applications, it may be desirable to leave the body unattended while the loading mechanism is operating. In such a case, a timer 94 is incorporated as a part of the control panel 92 and serves to automatically terminate operation of the motor after a pre-determined time. In other cases, particularly where large amounts of trash are disposed at fairly regular intervals, it may be desirable to have the loading mechanism automatically run for predetermined time periods at preselected time intervals throughout the day. To accomplish this, the timer 94 is adapted both to stop and start the motor.

The various elements of the electric-hydraulic system are supported entirely on the frame 12 at the forward end wall of the receptacle 14 within a protective housing 95, illustrated in FIGURES 2 and 3. A horizontally oriented bracket 96 projecting forwardly from the end wall serves to support these various elements. Access to the housing, and in particular to the control panel located therein, is through a front opening normally closed by a hingedly mounted cover 98.

Actuation of the control valve 88 to cause the cylinder-piston assembly to reverse operation automatically at the ends of its stroke is by means of a mechanical linkage 100, illustrated in FIGURES 5 to 7. The linkage 100 includes a rod 102 slidably mounted on the side of the receptacle 14 by a pair of spaced apart support brackets 104. Linkage of the rod 102 to the valve is by a pair of tension springs 106 and an actuating arm 108 on the valve. The rod is friction-held, so that when it is in a given limit position, such as the one illustrated in full lines of FIGURES 6 and 7, it will maintain that position until moved to the other limit position, illustrated in phantom lines. It will likewise remain in the latter position until moved again.

Fingers 110 and 111 fixed to the rod 102 project inwardly through slots 112 in the receptacle 14 and are arranged to be engaged by the blade assembly 22 as it reciprocates. This causes the rod 102 to slide and thereby reverses operation of the control valve 88. Specifically, the finger 110 is engaged by one of the side plates 60 in the manner illustrated in full lines in FIGURES 5 and 6 to slide the rod 102 to the right to actuate the valve 88 to the position of FIGURE 7. This, in turn, causes fluid to be directed by the main valve 86 to the cylinder-piston assembly 72 in such a manner as to cause it to extend and thereby move the blade assembly toward the passage 42. On the other hand, when the assembly 22 has moved to its opposite limit position, a projection 114 on the adjacent one of the side arms 62 engages the finger 111 to actuate the valve to its phantom line position of FIGURE 7. Operation of the main valve is reversed and fluid is directed in to the blade assembly to move it back to its retracted position of FIGURE 5. This sequence of operation is automatic and, of course, continues so long as the motor 90 is actuated.

Operation

In use, assuming the body is in place at the collection site, refuse is dumped from the usual hand-carried containers and the like into the loading compartment 16 through its top opening 48. At any convenient time, e.g., during loading of the compartment 16, after that compartment is partially filled or filled to capacity, the loading mechanism 20 is actuated to pack the refuse into the storage compartment 18. This is accomplished at the conveniently located control panel 92. Should it be desired that operation of the mechanism 20 terminate automatically or that it operate for predetermined time periods at periodic intervals, then the timer is appropriately adjusted and put into operation.

As the blade assembly 22 moves from its retracted position to its extended position, illustrated in full phantom lines, respectively, in FIGURE 2, refuse in the space S between the packing blade 56 and the passage 42 will be pushed along the floor and through the passage into the storage compartment 18. As may be seen in phantom lines in FIGURE 2, the blade assembly 22 moves part way into the storage compartment in reaching its fully extended position. This has the advantage of minimizing the tendency of refuse to fall or expand back into the loading compartment as the assembly 22 is retracted.

Once the blade assembly 22 reaches its fully extended position, the control valve 88 is automatically actuated in the manner previously described to reverse movement of the packing blade assembly 22. During subsequent retraction of the assembly 22, refuse falls or is scraped off of the top of the cover 58 by the baffle plate 70 and drops into the space S on the working side of the blade. In this manner a charge of refuse is obtained for the next packing stroke. As is apparent from the structure, refuse may be dumped continuously into the loading compartment during such reciprocation of the blade assembly. Depending upon the position of the assembly 22 and the extent to which the loading compartment 16 is filled, refuse either drops into the space S on the working side of the blade 56, on top of the cover 58 or in the space above the cover.

The usual loosely packed refuse comprising paper products and the like will be compacted to some extent as it is pushed from the loading compartment through the passage 42 and into the storage compartment 18. Further compaction results as refuse accumulates in the storage compartment and that which is being loaded is compressed against that already in place. The top and rear walls of the storage compartment 18 serve as barriers against which final compaction takes place. In this manner the capacity of the storage compartment is greatly increased as compared to conventional bodies without a self-loading mechanism. Moreover, since the compartment 18 is closed, it may be loaded to capacity without danger of refuse spilling or blowing out.

Once the storage compartment 18 is filled to capacity, the space within the loading compartment may also be used for storage of refuse. Assuming this is the case, when it is also filled, the body is readied for hauling to the dump. This involves closing the top opening 48 with the cover 50 to close off the receptacle from the exterior. The body is then disconnected from the source of electrical power, assuming such a source is used, and the body is ready to be hauled to the dump for emptying.

The body 10 may be conveniently maneuvered about on the ground surface by virtue of the wheels 38 and 39, preparatory to loading it on the truck. Loading of the body on the truck is then carried out, such loading being facilitated by the rollers 36 on the underside of the frame 12.

The procedure usually followed is to bring an empty body to the collection site on the truck and exchange it for the filled one. The filled one is then taken directly to the dump where it is emptied and thus readied for subsequent use. Dumping is accomplished by opening the rear doors 55 and tilting the truck frame 26 upwardly. In cases where electrical power is available at the dump site, the self-loading mechanism 20 may be operated to assist unloading. Should the loading compartment 16 be used to store an additional quantity of trash, as suggested above, such operation of the mechanism is particularly desirable.

While one embodiment of the invention has been illustrated and described in considerable detail, it will be understood that this was only by way of example and that various changes in the constructions and the arrangements of various parts may be made without departing from the spirit and scope of the invention.

I claim:

1. An interchangeable refuse truck body of the type described, comprising:
   a frame;
   an elongated and generally closed receptacle on said frame having a floor, a top wall, side walls, and forward and rearward end walls;
   a bulkhead laterally disposed in said receptacle separating it into a forward loading compartment and a rearward storage compartment, said bulkhead cooperating with said receptacle to define a passage between said compartments;
   said loading compartment;
   said loading compartment;
   a packing blade assembly reciprocably mounted in said loading compartment for pushing refuse from said loading compartment through said passage into said storage compartment;
   power-operated means on said frame adjacent to said forward end wall of said receptacle for reciprocating said packing blade assembly, said power-operated means includes a hydraulic cylinder-piston assembly and an electric-hydraulic system for supplying pressurized hydraulic fluid to said assembly, control means on said power-operated means for automatically reciprocating said packing blade assembly for predetermined time periods at preselected time intervals and wherein said control means includes a timer for controlling the operation of said electric-hydraulic system.

2. An interchangeable refuse truck body of the type described, comprising:
   a frame having upper and lower sides;
   an elongated and generally closed receptacle secured to said frame on the upper side thereof and having a floor, a top wall, side walls, and end walls;
   means including a plurality of wheels mounted on said frame and projecting downwardly from the lower side thereof, said means being adapted to engage the underlying surface to support said body for movement thereon;
   a bulkhead laterally disposed in said receptacle separating it into a loading compartment and a rearward storage compartment, said bulkhead cooperating with said receptacle to define a passage between said compartments;
   means on said receptacle forming a loading opening to said loading compartment;
   a packing blade assembly disposed in said loading compartment and having a packing blade arranged transversely and oriented generally vertically and cover means extending forwardly from the upper edge of said blade;
   means on said receptacle and packing blade assembly for pivotally mounting said packing blade assembly for swinging movement in an arcuate path about an axis oriented transversely of said receptacle and located adjacent the top wall thereof, said blade assembly being reciprocably movable as aforesaid for pushing refuse from said loading compartment through said passage into said storage compartment;
   baffle means mounted in said loading compartment and arranged with one edge in close proximity to said cover so as to cooperate therewith to push refuse off of said cover and onto said floor at a location rearwardly of said blade as said assembly swings away from said passage; and
   power-operated means on said frame for so moving said packing blade assembly.

3. An interchangeable refuse truck body of the type described, comprising:
   a frame having upper and lower sides;
   an elongated and generally closed receptacle secured to said frame on the upper side thereof and having a floor, a top wall, side walls, and forward and rearward end walls;
   means including a plurality of wheels mounted on said frame and projecting downwardly from the lower side thereof, said means being adapted to engage the underlying surface to support said body for movement thereon;
   a bulkhead laterally disposed in said receptacle and extending thereacross separating it into a loading compartment and a storage compartment, said bulkhead being spaced above said floor to define a passage between said compartments;
   a packing blade assembly including a packing blade arranged transversely and oriented generally vertically in said loading compartment and extending thereacross, and an arcuate shaped cover extending forwardly from the upper edge of said blade;
   means on said receptacle for pivotally mounting said packing blade assembly for swinging movement in an arcuate path about an axis oriented transversely of said receptacle and located adjacent the top wall thereof, said blade assembly being movable as aforesaid for pushing refuse from said loading compartment along said floor through said passage into said storage compartment;
   a baffle mounted on said loading compartment and arranged with one edge in close proximity to said cover so as to cooperate therewith to push refuse off of said cover and onto said floor at a location rearwardly of said blade as said assembly swings away from said passage;

power-operated means on said frame and located entirely above the lower side thereof for so moving said packing blade assembly.

4. The subject matter of claim 3 including cover means on said receptacle for closing said loading compartment.

5. The subject matter of claim 3 including control means embodying a timer for controlling the operation of said power-operated means.

References Cited

UNITED STATES PATENTS

| | | | |
|---|---|---|---|
| 3,071,264 | 1/1963 | Totaro et al. | 214—515 X |
| 3,231,111 | 1/1966 | Clar | 214—83.3 |

FOREIGN PATENTS 707,317  4/1954  Great Britain.

GERALD M. FORLENZA, *Primary Examiner.*

ALBERT J. MAKAY, *Examiner.*

UNITED STATES PATENT OFFICE

CERTIFICATE OF CORRECTION

Patent No. 3,370,525                  February 27, 1968

Samuel V. Bowles

It is certified that error appears in the above identified patent and that said Letters Patent are hereby corrected as shown below:

Column 7, lines 62 and 63, strike out "said loading compartment; said loading compartment; and insert instead -- means on said receptacle forming a loading opening to said loading compartment; --.

Signed and sealed this 15th day of July 1969.

(SEAL)
Attest:

Edward M. Fletcher, Jr.             WILLIAM E. SCHUYLER, JR.

Attesting Officer                    Commissioner of Patents